United States Patent [19]

Blum et al.

[11] Patent Number: 5,406,341
[45] Date of Patent: Apr. 11, 1995

[54] TORIC SINGLE VISION, SPHERICAL OR ASPHERIC BIFOCAL, MULTIFOCAL OR PROGRESSIVE CONTACT LENSES AND METHOD OF MANUFACTURING

[75] Inventors: Ronald D. Blum, Roanoke, Va.; Amitava Gupta, San Marino, Calif.

[73] Assignee: Innotech, Inc., Roanoke, Va.

[21] Appl. No.: 980,053

[22] Filed: Nov. 23, 1992

[51] Int. Cl.[6] ............... G02C 7/04; B29D 11/00
[52] U.S. Cl. ............... 351/160 R; 264/1.8; 264/2.4; 264/2.7; 351/160 H; 351/161; 351/177
[58] Field of Search ............... 351/160 R, 160 H, 161, 351/162, 177; 264/1.8, 2.4, 2.7

[56] References Cited

U.S. PATENT DOCUMENTS

| | | | |
|---|---|---|---|
| 5,129,718 | 7/1992 | Futhey et al. | 351/161 |
| 5,142,411 | 8/1992 | Fiala | 359/494 |
| 5,170,192 | 12/1992 | Pettigrew et al. | 351/161 |

OTHER PUBLICATIONS

Kendall, C. A.; "Ultrafocal ® Bifocal Contact Lens"; *Contacto*; Jan. 1976; pp. 31–35.

*Primary Examiner*—Scott J. Sugarman
*Attorney, Agent, or Firm*—Kenyon & Kenyon

[57] ABSTRACT

A method for making a finished aspheric single vision, spherical or aspheric bifocal, multifocal or progressive addition contact lens includes the step of fitting a patient requiring a near correction with a single vision spherical or aspheric contact lens for optimal distance vision and comfortable fit. The patient is then over-refracted to determine the required near correction to be embodied in the contact lens. A portion of the optic corresponding to the center location of the pupil is marked on the convex side of the optic to form an optical preform. The optical preform is removed from the eye of the patient and the concave side of the optical preform is marked at a position corresponding to the mark on the convex side that denotes the center of the pupil. The mark disposed on the convex side of the optical preform is removed. A specified volume of polymerizable resin is placed in a mold embodying the required correction, which includes an add power zone so that the resin fills the intervening space between the mold and the optical preform. The add power zone is aligned on the optical preform to a predetermined position with respect to the mark on the optical preform designating the center of the pupil. The resin is then polymerized the optical preform is demolded to obtain the finished contact lens having the required correction.

59 Claims, 5 Drawing Sheets

TORIC SINGLE VISION, SPHERICAL OR ASPHERIC BIFOCAL, MULTIFOCAL OR PROGRESSIVE CONTACT LENSES AND METHOD OF MANUFACTURING

BACKGROUND OF THE INVENTION

The present invention relates generally to a method for manufacturing contact lenses, and more particularly to method for manufacturing a finished aspheric single vision, spherical or aspheric bifocal, multifocal or progressive addition contact lens.

Contact lenses are generally manufactured by a machining or casting process. The machining process begins with a plastic disk or a blank, which is blocked on an arbor with a suitable wax, then mounted into a collet of a multi-axis lathe turning machine. After machining the first surface, the part is transfer blocked to a second side arbor and the second surface machined as before. Such a simple lathe turning process can only provide centrosymmetric optic geometries. Contact lenses embodying non-centrosymmetric geometries can only be manufactured by a casting process using a mold having an appropriate surface geometry. Thirty years of studying the casting process has led to the development of several efficient and rapid molding processes for contact lenses that incorporate complex optimal geometries, such as toric contact lenses, bifocal aspheric contact lenses and so on.

While contact lenses are worn by over 10% of all antimetropes in the U.S., bifocal or multifocal contact lenses have enjoyed only a mixed success. No bifocal or multifocal contact lens has been successfully accepted by more than 70% of the patients fitted with a particular design. It is believed that a contact lens fits over the cornea of an individual in a unique manner, so that the spacial relationship between the optical center of the lens and the cornea is not entirely predictable. In other words, the lens undergoes microscopic movement after being fitted on a patient, until it achieves the more stable position over the cornea. This movement is too small to cause any significant change in the refractive correction provided by the lens, if the lens is of single vision type; however, for certain bifocal contact lenses to work properly, the add power zone must always line up within the pupillary aperture, therefore, even this microscopic repositioning over the cornea may shift the add power zone out of the pupillary aperture and create refractive problems for the patient.

The reason why the add power zone must be centered with respect to the pupil and occlude a certain optimum fraction of the pupillary aperture is that for a multifocal lens to function properly, the retina should receive all the images at the same time. For distant objects, the image formed by the base power zone is focused, while the image formed by the add power zone is not focused. For near objects, the image formed by the base power zone is defocused, while the image formed by the add power zone is focused. Given one focused and one or more defocused images, the image processing apparatus at the retina and the visual cortex rejects the unfocused images and processes the focused image.

Persons with normal accommodation not requiring any refractive correction also receive multiple images simultaneously at their retina, and possess the ability to ignore the defocused image of far objects when looking at near objects, and vise versa. This analogy to a normal eye indicates that for a bifocal or multifocal contact lens to work properly, the add power zone must be entirely within the pupillary aperture. Since image strength at the retina is proportional to the area of the corresponding refractive zone (i.e., add or base power) subtended at the pupil, the optimum area of the add power zone can be computed with respect to the pupil size. It is known that pupil size varies from person to person and also depends on the level of ambient illumination and physiochemical status of the individual. For example, the pupil size of a thirty year old can vary from 2.2 mm in direct sunlight to 5.7 mm outdoors at night. Data on pupil size distributions by age and illumination level are available in the literature. The assumption may also be made that the contact lens wearer will generally be outdoors when experiencing extreme levels of illumination, where distance vision will be needed the most, whereas ambient illumination is at an intermediate level indoors, where near and intermediate vision is required most often. Based on these considerations, it is possible to develop a model which predicts the optimum sizes of the add power zone for near vision/base power zone for distance vision and aspheric zones for intermediate vision, if needed such a model is disclosed in one of the Applicant's letters patent (U.S. Pat. No. 5,112,351).

In view of the necessity of locating the base, as well as add power zones of the contact lens within the pupillary aperture, it would therefore be desirable to provide a manufacturing method which will place the base power zone and the add power zone of the contact lens concentrically about a point on the lens optic directly in contact with the center of the pupillary aperture, after the lens has stabilized itself on an individual cornea.

SUMMARY OF THE INVENTION

The present invention provides a method for manufacturing a finished contact lens in which a single vision lens having a base power for fitting purposes is first placed on the patient and allowed to stabilize on the cornea. The lens is then marked to denote the location of the center of the pupil and the appropriate optical modification is then added. The modification may be a combination of spherical and aspheric curvatures outside or within the zone of pupillary aperture, estimated from available data on pupillary apertures at different ambient illumination levels for a typical patient of that age. Such optical modifications may be centrosymmetric, and centered on the center of the pupil, or may be asymmetric with respect to the pupillary center. Furthermore, they can be aligned with respect to the pupil, but located outside of the pupillary zone. Such a contact lens will be able to provide satisfactory vision for antimetropes as well as presbyopes, and avoid the problems of known bifocal contact lenses that are currently being evaluated.

The present invention provides a method of casting contact lenses that operates in accordance with the above described-sequence of manufacturing steps. This method employs a process called SurfaceCasting ™, which allows the casting of an aspheric single-vision, spherical or aspheric bifocal, multifocal or progressive addition optic surface over a any part of a finished contact lens optic. Details of this casting process have been disclosed in U.S. application Ser. No. 779,317, now U.S. Pat. No. 5,219,497.

The SurfaceCasting ™ method utilizes a photothermal curing process to cure a resin layer within a mold assembly consisting of a mold embodying the final optical geometry, the resin layer, and the contact lens preform. The finished contact lens (known heretofore as the "optical preform") is so selected that it incorporates the desired posterior concave curvature required for fitting the patient. Thus, the optical preform may be spherical or aspheric in anterior geometry, and may incorporate a correction for astigmatism. The range of dioptric powers of the optical preform which can be modified by SurfaceCasting TM is +15.00 D to −15.00 D. Additionally, astigmatism over the range −1.00 D to −5.00 D can be accommodated. Furthermore, it is possible to successfully SurfaceCast an addition zone for near vision for the final optic. Powers of this zone which can be incorporated for the add zone typically range from +1.00 D to +3.50 D in 0.25 D steps.

Various other advantages of the methods of the present invention and lenses made thereby will be evident from the detailed description of certain embodiments below.

DETAILED DESCRIPTION OF THE INVENTION

According to the present invention, the patient is first fitted with an optical preform. The curvature of the preform is selected so that the patient is comfortable. At this time, the patient is provided only with distance correction, so that plano lenses are used, if necessary. The preform may be fabricated from a hydrophilic polymer, preferably with a high water content, or a rigid, hydrophobic, gas permeable material, with a high oxygen permeability (Dk/1>45).

The convex curvature of the optical preform should have a specific relationship with the concave curvature of the mold in order to control the power (base and add) of the final optic and the thickness of the added layer.

The spherical power range spans 30 diopters in 0.25 D increments, from +15.00 D to −15.00 D. It may also incorporate cylindrical correction in the range of 0.00 D to −5.00 D, in 0.25 D increments. The optical preform is provided with a mark on opposing ends of a diameter denoting the direction or the axis of the cylinder, if any is incorporated in the optical preform. Preferably, the optical preform is formed from a material that is transparent to ultraviolet radiation in the wavelength range 320–400 nm, providing at least 80 % transmission.

The method of the present invention may employ a preform that consists of a cross-linked, hydrophilic network, with water uptake ranging from 37% to 75%, composed of a mixture of acrylates, methacrylates, vinyl carbazoles, at least some of which carry hydroxy or amino substitutes, e.g., hydroxyethyl methacrylate, or N- or C-methyl vinyl carbazole, N,N-dimethylamino ethyl methacrylate, as well as hydrophobic acrylates, methacrylate or vinyl compounds, such as methyl methacrylate, ethyl methacrylate, propyl methacrylate, ethyl acrylate, butyl acrylate, styrene, substituted styrenes and, without limitation, other monomers commonly used in contact lens manufacturing. Another type of preform that may be employed is a preform formed from a rigid gas permeable material such as a cross-linkers siloxane. The network incorporates appropriate cross-linkers such as N, N'-dimethyl bisacrylamide, ethylene glycol diacrylate, trihydroxy propane triacrylate, pentaerythritol tetraacrylate and other similar polyfunctional acrylates or methacrylates, or vinyl compounds, such as N-methylamino divinyl carbazole. The initiator may be a thermally activated free radical polymerization initiator, such as azoisobutyronitrile, benzoyl peroxide, other peroxides, percarbonates or peracetates, commonly used in, contact lens manufacturing or photochemical initiators, such as substituted benzophenones or acetophenones commercially available as Iragacure 184 and Iragacure 650 from Ciba Geigy, Kip 100F from Sartomer or Darocure 1173 from Radcure corp.

While the use of hydrophilic polymers is recommended in view of their superior biocompatibility, the method of fabricating aspheric single vision, spherical or aspherical bifocal, multifocal or progressive addition contact lenses of the present invention as described herein is fully applicable to any type of optical preform or spherical contact lens. For example, rigid, gas permeable contact lenses fabricated from acrylic terminated siloxanes, or rigid PMMA contact lenses may be employed in connection with SurfaceCasting TM. Moreover, the surface of the optical preform may be modified in any manner desired to enhance the bonding between the resin and the preform.

Once the fit has been established with the optical preform, the patient is refracted through the lens (over-refracted) to determine the needed add power. The center of the pupil is then marked on the anterior or convex side of the optic, and the lens is removed from the eye for SurfaceCasting TM the add power zone, and, when appropriate, the modification of the distance power. Depending on the patient's desires and lifestyle, either a bifocal (e.g., is a spherical crescent or flat top configuration) or a progressive addition style add power zone is selected four SurfaceCasting TM. The design of the molds used in connection with the SurfaceCasting TM process calls for the use of annealed glass that is capable of transmitting ultraviolet radiation in the wavelength range of 350–420 nm, with a minimum transmission of 80% for manufacturing of the molds.

Referring to the figures, due to the very thin nature of the optical contact lens preform 20, it is possible to photocure through the concave side of the contact lens preform 20 using a metal or reflective mold 40 positioned on the convex side. However, other materials that are transparent to ultraviolet radiation in the above mentioned wavelength range will generally be used. The molds 40 may be either reusable, (e.g., those made of glass) or disposable (e.g., those made of polypropylene or some other similar polymeric material), which can be injection molded and which form dimensionally accurate forms with a high quality surface finish.

Figure 1:
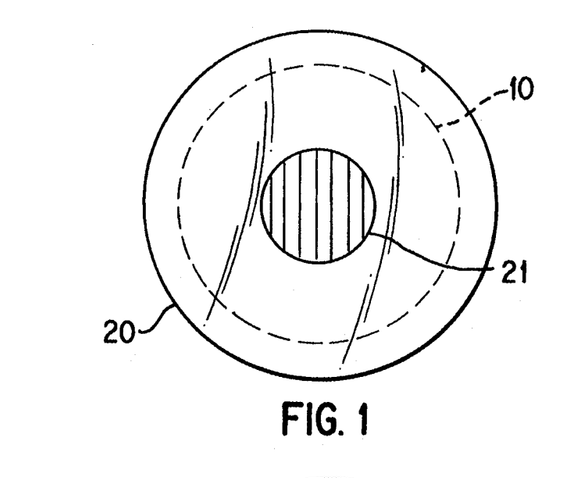
FIG. 1 schematically illustrates the placement of a bifocal contact lens over the pupillary aperture in which the add power zone is concentric with the pupillary center.
Figure 2:
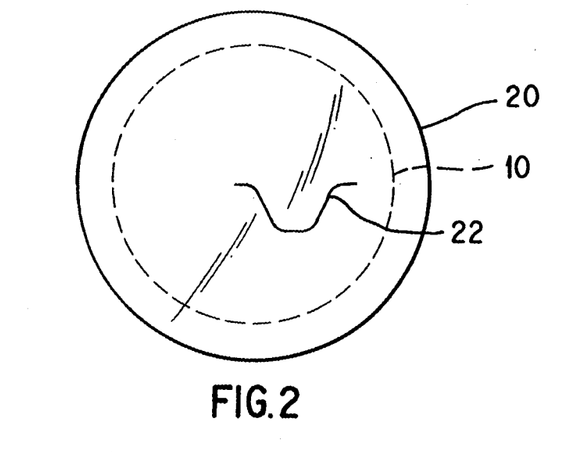
FIG. 2 schematically illustrates the placement of a progressive addition contact lens over the pupillary aperture, in which the add power zone is not concentric with the center of the pupil.
Figures 3A, 3B:
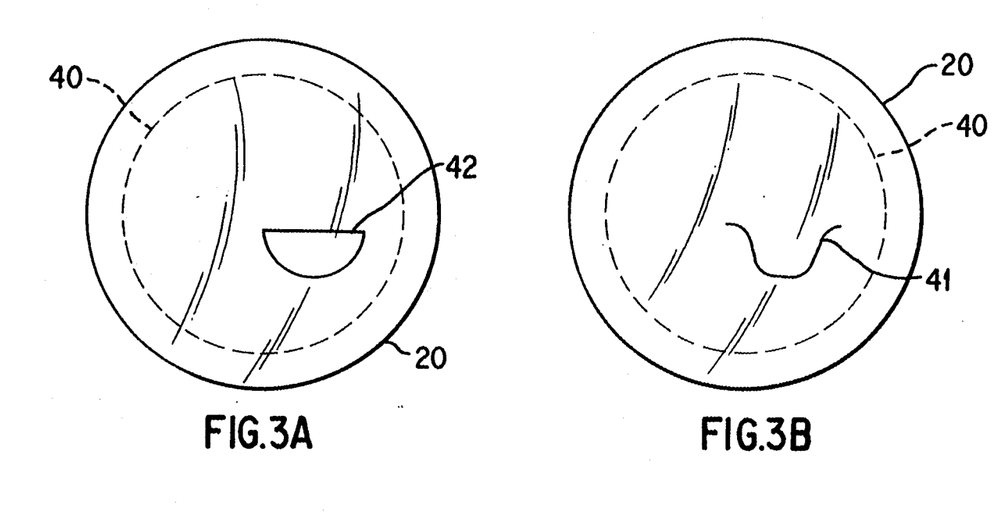
FIGS. 3A and 3B, 3C and 3D schematically illustrate plan views of the optical preform and the SurfaceCasting TM mold, incorporating a bifocal add with a visible segment or a progressive add power zone.
Figure 3C:
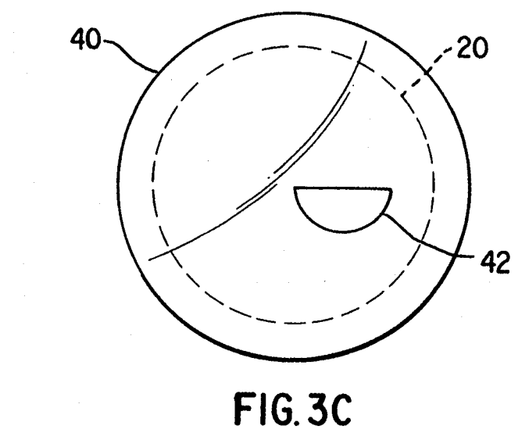
Figure 3D:
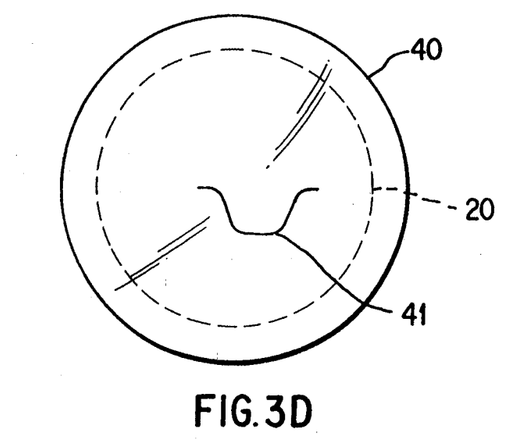

One example of the mold design that may be employed by the present invention is shown in FIG. 3A. In this design, the add power (bifocal) zone is concentric to the pupil, is annular in shape and occupies an area of approximately 6.3 sq. mm. In this example the circular mold incorporates a central zone having the same curvature as the anterior curvature of the optical preform, so that distance vision at the center of the pupil may be provided. The remainder of the mold also has the same curvature as the anterior curvature of the optical preform, again ensuring that the ratio of image strengths between far and near objects is preserved for large pupils.

FIG. 3B shows a non-centrosymmetric progressive addition mold. Again, the add power zone is offset from the center of the mold so that a distance power zone is provided at or about the center of the mold, which in this case is positioned in a non-centrosymmetric manner. In this example the area of the progressive addition zone is approximately 7.5 sq. mm, and incorporates approximately 1.2 sq. mm of area for intermediate vision.

Figure 7:
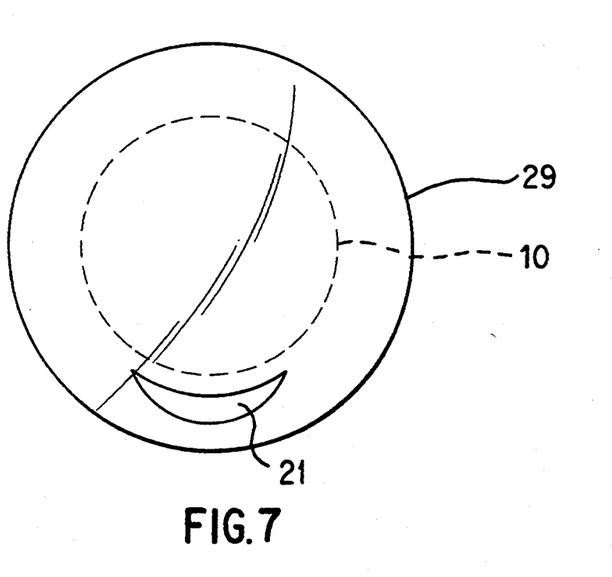
FIG. 7 a plan view of a contact lens that incorporates a crescent bifocal zone.

Another lens design is also shown in FIG. 3B In this embodiment the add power zone is noncentrocymmetric with respect to the pupillary center, and consists of a spherical segment which might be of semi-circular, circular or any other shape. Generally, the area of the add power zone occluded by the pupillary opening should not exceed 60 percent out of the total pupillary area and should be not less than 30 percent of the pupillary area. In a further embodiment of the invention, which is shown in FIG. 7, the contact lens 29 incorporates a crescent bifocal zone 21 which is located below the pupillary aperture 10 and which, upon a downward gaze, translates upward to be located within the pupillary aperture 10 for near vision.

Figure 4A:
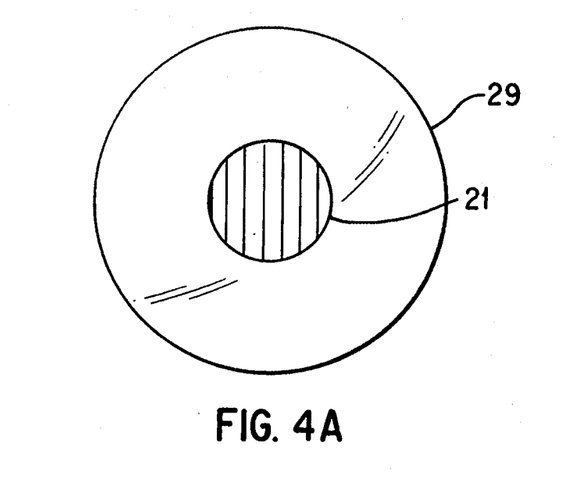
FIGS. 4A–4F schematically illustrate plan views of various contact lens designs that may be constructed according to the principles of the present invention.
Figure 4B:
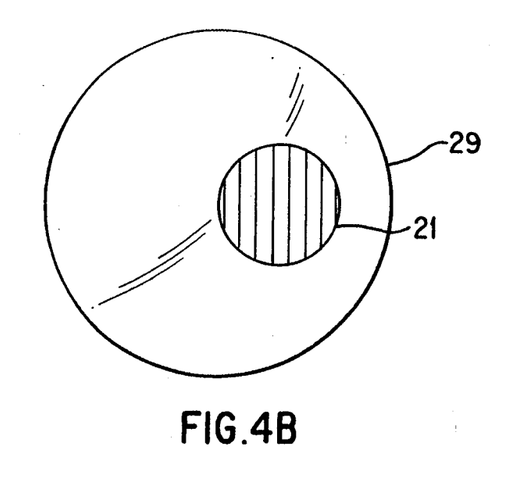
Figure 4C:
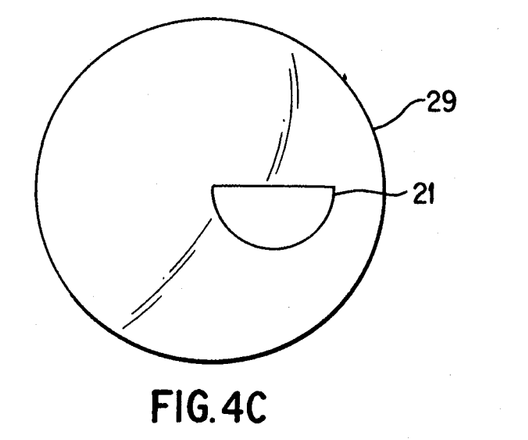
Figure 4D:
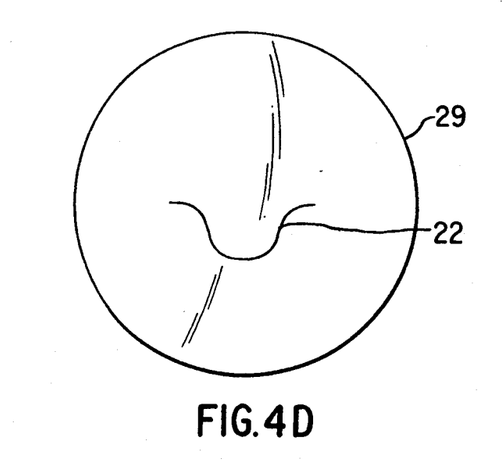
Figure 4E:
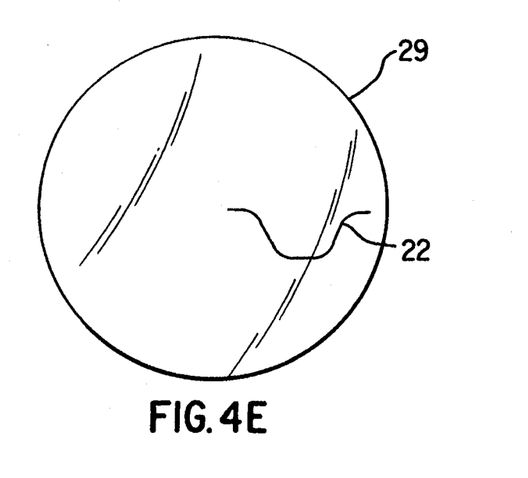
Figure 4F:
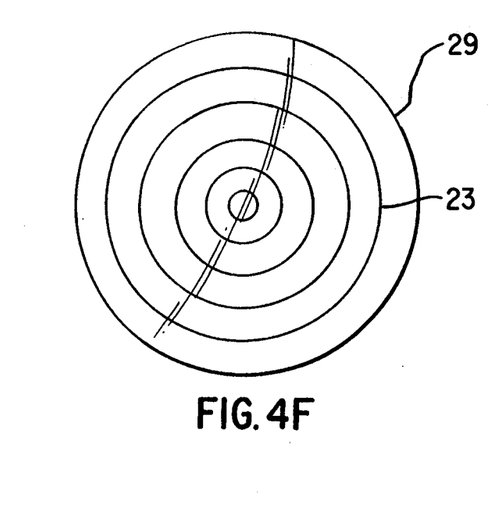
Figure 5A:
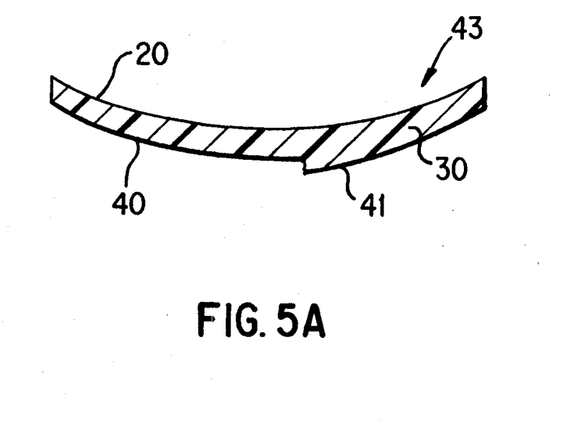
FIGS. 5A–5D illustrate cross-sectional views of the mold assembly employed in the method of the present invention.
Figure 5B:
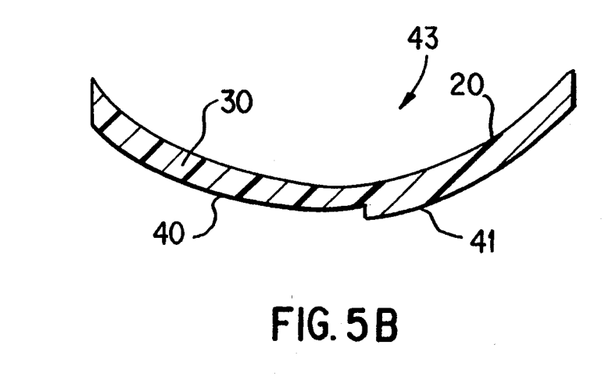
Figure 5C:
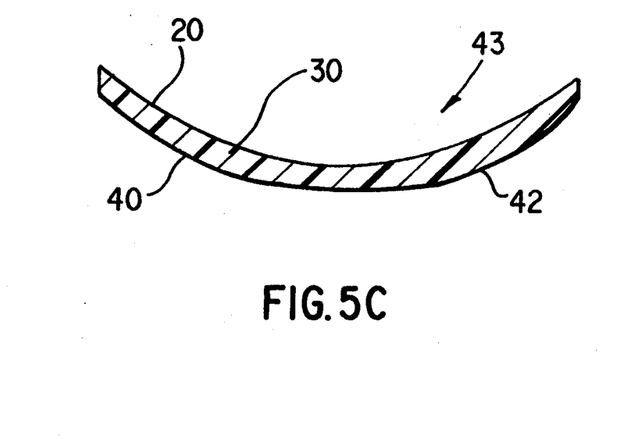
Figure 5D:
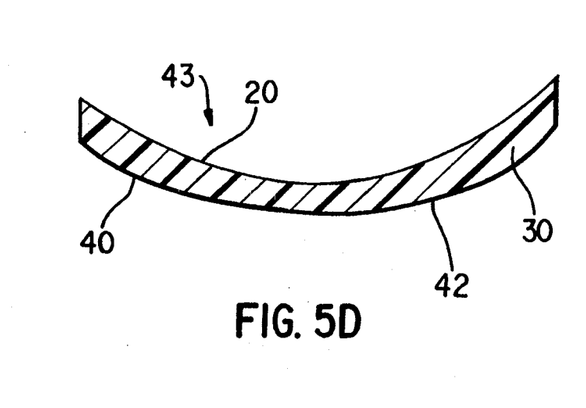
Figure 6:
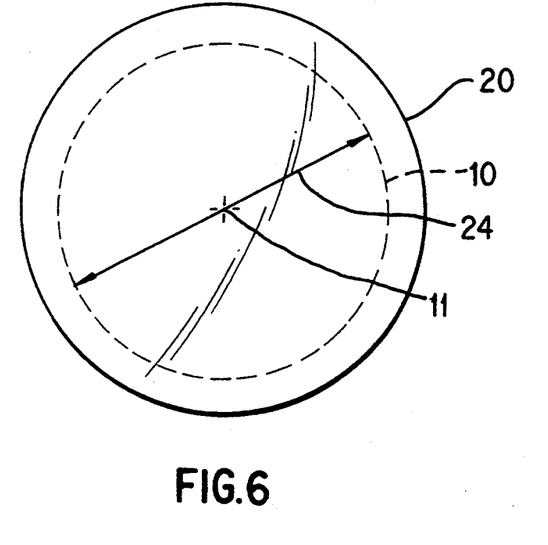
FIG. 6 illustrates a plan view of the optical preform, appropriately marked to align a cylinder or a progressive addition zone wit respect to the center of the pupil and the optic axis of the eye.

While the fitting method of the present invention has been described above for a refractive bifocal 21 or multifocal contact lens, the method may also be employed to fabricate any type of diffractive contact lenses 23 such has (but not limited to) Fresnel zone plates, as shown in FIG. 4F, or contact lenses of Fresnel lens design. In each case, it is necessary to locate and mark the center of the pupil 11, on the base contact lens optic 20, and then use the mark to locate and center the add segment, in this case a set of concentric zone plates or Fresnel lens segments.

In another embodiment of the invention, the optical preform 20, in the hydrated or anhydrous state, is mounted on a frame with its anterior side up. A premeasured amount of a polymerizable resin 30 is placed over the top of the preform 20, and the mold 40 is immediately placed over the resin 30, allowing the resin 30 to spread and fill up the intervening space between the mold 40 and the optical preform 30. The mark made on the optical preform 30 is now lined up with the geometric center of the mold 40. The mold 40 is rotated until the axis of the cylinder 24 incorporated in the optical preform 20 is in correct alignment with the add power zone of the mold 44. The mold assembly 43 is then placed in a curing chamber and cured for a period ranging from 2 seconds to 180 minutes, following a predetermined cure schedule. The temperature of the mold assembly 43 is controlled to within $+/-1°$ C. during the cure process. Either heat, light, or a combination of the two may be used to effect the cure process, depending on the polymerization initiator or initiators used in the resin formulation.

In another embodiment of the invention a specified volume of polymerizable resin 30 is placed in the bowl of an optical mold 40 which incorporates the final optical design of the finished lens (for example, a bifocal addition 42 or a progressive addition 41 lens zone in the mold 40). The optical preform and mold can have substantially the same or substantially different curvatures. The optical preform 20 is placed on the resin 30, allowing the resin 30 to spread out and fill the space between the preform 20 and the mold 40. This mold assembly 43 is then cured in a curing chamber as described above.

In another embodiment of the invention, the convex surface of the optical preform is surface modified prior to casting the add zone segment so that a stronger and more durable bond may be developed between the surface of the optical preform and the added layer. Such a surface modification may, without limitation, consist of a mechanical roughening of the surface, treatment by an energy source such as heat, ultraviolet, X or gamma radiation, treatment leading to a chemical etching of the surface or addition of a thin layer of a new chemical designed to enhance bonding properties.

The resin formulation used in the SurfaceCasting TM process consists of a mixture of hydrophilic acrylates, methacrylates and vinyl carbazoles, which on curing produces a cross-linked hydrophilic network that has water uptake similar to the material of the optical preform. In fact, the same resin formulation may be used to produce the SurfaceCast TM as the optical preform. Even if a different formulation is chosen for the SurfaceCast TM, the water uptake of the SurfaceCast TM layer should be matched to within 1% of that of the optical preform, in order to avoid differential swelling and the resulting distortion of the optic.

If the formulation used for the SurfaceCast TM is miscible with water, the SurfaceCasting TM operation may be performed on the optical preform while in the hydrated state. If the SurfaceCasting TM process is performed on a hydrated optical preform, the curing process must be completed rapidly, typically in less than two minutes, in order to avoid excessive diffusion of the monomer mixture into the preform. A photochemical curing process is particularly advantageous for this purpose. Alternatively, the preform may be dehydrated before SurfaceCasting TM, by drying it in an oven at 95° C. in an environment that includes a stream of dry nitrogen gas or, alternatively, in vacuum for 20 minutes. This procedure does not completely dehydrate the preform, but drives off more than 75% of the water absorbed in the optic. Dehydration of optical preforms which have water uptake greater than 50% is not recommended because dehydration may cause micro cracks to develop in the optic.

If the optical preform consists of a hydrophobic material, or if the formulation used for the SurfaceCast TM is not entirely miscible with water, the SurfaceCasting TM operation should be performed with the optical preform in a dehydrated state. Hydrophobic lenses which do not take up water may be used if a lens with a high refractive index is desired since the refractive index of hydrophilic lenses currently in use rarely exceed 1.42.

The above has been a detailed discussion of certain embodiments of the present invention. They should not be considered so as to limit the scope of applicants' invention which is defined by the appended claims.

What is claimed is:

1. A method for making a finished spherical or aspheric bifocal, multifocal or progressive addition contact lens, comprising the steps of:
   fitting a patient requiring a near correction with an optic comprising a single vision contact lens for optimal distance vision and comfortable fit;
   over-refracting the patient to determine the required near correction to be embodied in the contact lens;
   marking a portion of the optic corresponding to the center location of the pupil on the convex side of the optic to form an optical preform;
   removing the optical preform from the eye of the patient;
   marking the concave side of the optical preform at a position corresponding to the mark on the convex side denoting the center of the pupil;
   removing the mark disposed on the convex side of the optical preform;
   placing a specified volume of polymerizable resin in a mold embodying the required correction that includes an add power zone so that the resin fills intervening space between the mold and the optical preform;
   aligning the add power zone on the optical preform to a predetermined position with respect to the mark on the optical preform designating the center of the pupil;
   polymerizing the resin; and
   demolding the optical preform to obtain the finished contact lens having the required correction.

2. The method of claim 1 wherein the single vision contact lens has at least one mark to mark a cylinder axis incorporated therein.

3. The method of claim 1 wherein the step of polymerizing the resin comprises the step of polymerizing the resin using heat, light or a combination of both.

4. The method of claim 1 wherein the step of polymerizing the resin comprises a curing process that includes the step of applying heat to a mold assembly that is formed from the optical preform, the resin and the mold.

5. The method of claim 4 wherein said curing process is performed at a temperature of between approximately 55° C. and 95° C.

6. The method of claim 1 wherein the step of polymerizing the resin comprises a curing process that includes the step of applying ultraviolet radiation to a mold assembly formed by the optical preform, the resin and the mold.

7. The method of claim 6 wherein said ultraviolet radiation has wavelength between 330 and 420 nm.

8. The method of claim 7 further comprising the step of applying heat to the mold assembly simultaneously with the application of ultraviolet radiation so that the temperature of the mold assembly has a specifiable temperature profile not less than 35° C. and not greater than 95° C.

9. The method of claim 1 further comprising the step of aligning the add power zone on the optical preform with respect to an astigmatic axis.

10. A finished spherical or aspheric bifocal, multifocal or progressive addition contact lens, said finished lens being made according to a method comprising the steps of:
    fitting a patient requiring a near correction with an optic comprising a single vision contact lens for optimal distance vision and comfortable fit;
    over-refracting the patient to determine the required near correction to be embodied in the contact lens;
    marking a portion of the optic corresponding to the center location of the pupil on the convex side of the optic to form an optical preform;
    removing the optical preform from the eye of the patient;
    marking the concave side of the optical preform at a position corresponding to the mark on the convex side denoting the center of the pupil;
    removing the mark disposed on the convex side of the optical preform;
    placing a specified volume of polymerizable resin in a mold embodying the required correction that includes an add power zone so that he resin fills intervening space between the mold and the optical preform;
    aligning the add power zone on the optical preform to a predetermined position with respect to the mark on the optical preform designating the center of the pupil;
    polymerizing the resin; and
    demolding the optical preform to obtain the finished contact lens having the required correction.

11. The finished lens of claim 10 wherein said add zone has a diffractive design.

12. The finished contact lens of claim 10 wherein said optical preform has a spherical power within the range of +15.00 D to −15.00 D and cylinder in the range of 0.00 D to −5.00 D.

13. The finished contact lens of claim 10 wherein said add power zone has an add power in the range of +1.00 D to +3.25 D.

14. The finished contact lens of claim 10 wherein said optical preform and said resin layer are formed from the same polymeric network.

15. The finished contact lens of claim 10 wherein said optical preform is a rigid, gas permeable hydrophobic contact lens.

16. The finished contact lens of claim 10 wherein said optical preform is a soft, cross-linked hydrophilic, polymer, with a water uptake in the range of 37% to 77% of total weight.

17. The finished contact lens of claim 10 wherein the cured resin comprises a rigid gas permeable hydrophobic material.

18. The contract lens of claim 10 wherein the cured resin comprises a soft, cross-linked hydrophilic polymer with a water uptake in the range of 37% to 77% of the total weight.

19. The finished contact lens of claim 10 wherein said optical preform is fabricated from a mono or multi-functional monomer selected from the group consisting of acrylates, methacrylates and vinyl derivatives, and oligomeric siloxanes, polyurethanes, polyoxymethylenes, carbonates, esters, epoxies, and amides terminated with acrylates, methacrylates and vinyl groups.

20. The finished contact lens of claim 10 wherein said cured resin layer is fabricated from a mono or multi-functional monomer selected from the group consisting of acrylates, methacrylates and vinyl derivatives, oligomeric siloxanes, polyurethanes and polyoxymethylenes, carbonates, esters, epoxides, aromatics and amides terminated with acrylates, methacrylates and vinyl groups.

21. The finished contact lens of claim 10 further comprising the step of aligning the add power zone on the optical preform with respect to an astigmatic axis.

22. A method for making a finished spherical or aspheric bifocal, multifocal or progressive addition contact lens, comprising the steps of:

fitting a patient requiring a near correction with an optic comprising a single vision contact lens for optimal distance vision and comfortable fit;

marking a portion of the optic corresponding to the center location of the pupil on the convex side of the optic to form an optical preform;

removing the optical preform from the eye of the patient;

marking the concave side of the optical preform at a position corresponding to the mark on the convex side denoting the center of the pupil;

removing the mark disposed on the convex side of the optical preform;

placing a specified volume of polymerizable resin in a mold embodying the required correction that includes an add power zone so that the resin fills intervening space between the mold and the optical preform;

aligning the add power zone on the optical preform to a predetermined position with respect to the mark on the optical preform designating the center of the pupil;

polymerizing the resin; and demolding the optical preform to obtain the finished contact lens having the required correction.

23. The method of claim 22 wherein the single vision contact lens has at least one mark to mark a cylinder axis incorporated therein.

24. The method of claim 22 wherein the step of polymerizing the resin comprises the step of polymerizing the resin using heat, light or a combination of both.

25. The method of claim 22 wherein the step of polymerizing the resin comprises a curing process that includes the step of applying heat to a mold assembly that is formed from the optical preform, the resin and the mold.

26. The method of claim 25 wherein said curing process is performed at a temperature of between approximately 55° C. and 95° C.

27. The method of claim 22 wherein the step of polymerizing the resin comprises a curing process that includes the step of applying ultraviolet radiation to a mold assembly formed by the optical preform, the resin and the mold.

28. The method of claim 27 wherein said ultraviolet radiation has wavelength between 330 and 420 nm.

29. The method of claim 28 further comprising the step of applying heat to the mold assembly simultaneously with the application of ultraviolet radiation so that the temperature of the mold assembly has a specifiable temperature profile not less than 35° C. and not greater than 95° C.

30. The method of claim 22 further comprising the step of aligning the add power zone on the optical preform with respect to an astigmatic axis.

31. A finished spherical or aspheric bifocal, multifocal or progressive addition contact lens, said finished lens being made according to a method comprising the steps of:

fitting a patient requiring a near correction with an optic comprising a single vision spherical contact lens for optimal distance vision and comfortable fit;

marking a portion of the optic corresponding to the center location of the pupil on the convex side of the optic to form an optical preform;

removing the optical preform from the eye of the patient;

marking the concave side of the optical preform at a position corresponding to the mark on the convex side denoting the center of the pupil;

removing the mark disposed on the convex side of the optical preform;

placing a specified volume of polymerizable resin in a mold embodying the required correction that includes an add power zone so that the resin fills intervening space between the mold and the optical preform;

aligning the add power zone on the optical preform to a predetermined position with respect to the mark on the optical preform designating the center of the pupil;

polymerizing the resin; and demolding the optical preform to obtain the finished contact lens having the required correction.

32. The finished lens of claim 31 wherein said add zone has a diffractive design.

33. The finished contact lens of claim 31 wherein said optical preform has a spherical power within the range of +15.00 D to −15.00 D and cylinder in the range of 0.00 D to −5.00 D.

34. The finished contact lens of claim 31 wherein said add power zone has an add power in the range of +1.00 D to +3.25 D.

35. The finished contact lens of claim 31 wherein said optical preform and said resin layer are formed from the same polymeric network.

36. The finished contact lens of claim 31 wherein said optical preform is a rigid, gas permeable hydrophobic contact lens.

37. The finished contact lens of claim 31 wherein said optical preform is a soft, cross-linked hydrophilic polymer, with a water uptake in the range of 37% to 77% of total weight.

38. The finished contact lens of claim 31 wherein the cured resin comprises a rigid gas permeable hydrophobic material.

39. The contact lens of claim 31 wherein the cured resin comprises a soft, cross-linked hydrophilic polymer with an water uptake in the range of 37% to 77% of the total weight.

40. The finished contact lens of claim 31 wherein said optical preform is fabricated from a mono or multi-functional monomer selected from the group consisting of acrylates, methacrylates and vinyl derivatives, and oligomeric siloxanes, polyurethanes, polyoxymethylenes, carbonates, esters, epoxies, and amides terminated with acrylates, methacrylates and vinyl groups.

41. The finished contact lens of claim 31 wherein said cured resin layer is fabricated from a mono or multifunctional monomer selected from the group consisting of acrylates, methacrylates and vinyl derivatives, oligomeric siloxanes, polyurethanes and polyoxymethylenes, carbonates, esters, epoxides, aromatics and amides terminated with acrylates, methacrylates and vinyl groups.

42. The finished contact lens of claim 31 further comprising the step of aligning the add power zone on the optical preform with respect to an astigmatic axis.

43. A method for making a finished toric single vision lens comprising the steps of:
   fitting a patient requiring a near correction with an optic comprising a single vision contact lens for optimal distance vision and comfortable fit;
   over-refracting the patient to determine the required toric correction to be embodied in the contact lens;
   marking a portion of the optic corresponding to the center location of the pupil on the convex side of the optic to form an optical preform;
   removing the optical preform from the eye of the patient;
   marking the concave side of the optical preform at a position corresponding to the mark on the convex side denoting the center of the pupil;
   removing the mark disposed on the convex side of the optical preform;
   placing a specified volume of polymerizable resin in a mold embodying the required correction that includes a toric zone so that the resin fills intervening space between the mold and the optical preform;
   aligning the toric zone on the optical preform to a predetermined position with respect to the mark on the optical preform designating the center of the pupil;
   polymerizing the resin; and
   demolding the optical preform to obtain the finished contact lens having the required correction.

44. The method of claim 43 wherein the single vision contact lens has at least one mark mark a cylinder axis incorporated therein.

45. The method of claim 43 wherein the step of polymerizing the resin comprises the step of polymerizing the resin using heat, light or a combination of both.

46. The method of claim 43 wherein the step of polymerizing the resin comprises a curing process that includes the step of applying heat to a mold assembly that is formed from the optical preform, the resin and the mold.

47. The method of claim 46 wherein said curing process is performed at a temperature of between approximately 55° C. and 95° C.

48. The method of claim 43 wherein the step of polymerizing the resin comprises a curing process that includes the step of applying ultraviolet radiation to a mold assembly formed by the optical preform, the resin and the mold.

49. The method of claim 48 wherein said ultraviolet radiation has wavelength between 330 and 420 nm.

50. The method of claim 49 further comprising the step of applying heat to the mold assembly simultaneously with the application of ultraviolet radiation so that the temperature of the mold assembly has a specifiable temperature profile not less than 35° C. and not greater than 95° C.

51. A finished toric single vision contact lens made according to a method comprising the steps of:
   fitting a patient requiring a near correction with an optic comprising a single vision spherical contact lens for optimal distance vision and comfortable fit;
   over-refracting the patient to determine the required toric correction to be embodied in the contact lens;
   marking a portion of the optic corresponding to the center location of the pupil on the convex side of the optic to form an optical preform;
   removing the optical preform from the eye of the patient;
   marking the concave side of the optical preform at a position corresponding to the mark on the convex side denoting the center of the pupil;
   removing the mark disposed on the convex side of the optical preform;
   placing a specified volume of polymerizable resin in a mold embodying the required correction that includes a toric zone so that the resin fills intervening space between the mold and the optical preform;
   aligning the toric zone on the optical preform to a predetermined position with respect to the mark on the optical preform designating the center of the pupil;
   polymerizing the resin; and
   demolding the optical preform to obtain the finished contact lens having the required correction.

52. The finished contact lens of claim 51 wherein said optical preform has a spherical power within the range of +15.00 D to −15.00 D and cylinder in the range of 0.00 D to −5.00 D.

53. The finished contact lens of claim 51 wherein said optical preform and said resin layer are formed from the same polymeric network.

54. The finished contact lens of claim 51 wherein said optical preform is a rigid, gas permeable hydrophobic contact lens.

55. The finished contact lens of claim 51 wherein said optical preform is a soft, cross-linked hydrophilic polymer, with a water uptake in the range of 37% to 77% of total weight.

56. The finished contact lens of claim 51 wherein the cured resin comprises a rigid gas permeable hydrophobic material.

57. The contact lens of claim 51 wherein the cured resin comprises a soft, cross-linked hydrophilic polymer with an water uptake in the range of 37% to 77% of the total weight.

58. The finished contact lens of claim 51 wherein said optical preform is fabricated from a mono or multi-functional monomer selected from the group consisting of acrylates, methacrylates and vinyl derivatives, and oligomeric siloxanes, polyurethanes, polyoxymethylenes, carbonates, esters, epoxies, and amides terminated with acrylates, methacrylates and vinyl groups.

59. The finished contact lens of claim 51 wherein said cured resin layer is fabricated from a mono or multifunctional monomer selected from the group consisting of acrylates, methacrylates and vinyl derivatives, oligomeric siloxanes, polyurethanes and polyoxymethylenes, carbonates, esters, epoxides, aromatics and amines terminated with acrylates, methacrylates and vinyl groups.

* * * * *

UNITED STATES PATENT AND TRADEMARK OFFICE
CERTIFICATE OF CORRECTION

PATENT NO. : 5,406,341

DATED : 11 April 1995

INVENTOR(S) : Ronald D. BLUM et al

It is certified that error appears in the above-identified patent and that said Letters Patent is hereby corrected as shown below:

| Column | Line | |
|---|---|---|
| 1 | 27 | Change "optimal" to --optical--. |
| 2 | 60 | Change "SurfaceCasting TM" to --SurfaceCasting ™--. |
| 2 | 67 | Change "SurfaceCasting TM" to --SurfaceCasting ™--. |
| 2 | 63 | Before "any" delete "a". |
| 3 | 10 | Change "SurfaceCasting TM" to --SurfaceCasting ™--. |
| 3 | 33 | Change "ting TM" to --ting ™--. |
| 3 | 45 | After "FIG. 7" insert --illustrates--. |
| 4 | 45 | Change "SurfaceCasting TM" to --SurfaceCasting ™--. |

UNITED STATES PATENT AND TRADEMARK OFFICE
CERTIFICATE OF CORRECTION

PATENT NO. : 5,406,341
DATED : 11 April 1995
INVENTOR(S) : Ronald, D. BLUM et al It is certified that error appears in the above-identified patent and that said Letters Patent is hereby corrected as shown below:

| Column | Line | |
|---|---|---|
| 4 | 54 | Change "SurfaceCasting TM" to --SurfaceCasting ™--. |
| 4 | 59 | Change "SurfaceCasting TM" to --SurfaceCasting ™--. |
| 4 | 61 | Change "faceCasting TM" to --faceCasting ™--. |
| 5 | 32 | After "3B" insert --.--. |
| 5 | 33 | Change "noncentrocymmet-" to --non-centrosymmet- --. |
| 5 | 50 | Change "has" to --as--. |
| 6 | 32 | Change "SurfaceCasting TM" to --SurfaceCasting ™--. |
| 6 | 38 | Change "SurfaceCast TM" to --SurfaceCast ™ |
| 6 | 40 | Change "faceCast TM" to --faceCast™-- and SurfaceCast TM" to --SurfaceCast™--. |
| 6 | 44 | Change "SurfaceCast TM" to --SurfaceCast™--. |
| 6 | 64 | Change "SurfaceCast TM" to --SurfaceCast™--. |

UNITED STATES PATENT AND TRADEMARK OFFICE
CERTIFICATE OF CORRECTION

PATENT NO. : 5,406,341
DATED : 11 April 1995
INVENTOR(S) : Ronald D. BLUM et al It is certified that error appears in the above-identified patent and that said Letters Patent is hereby corrected as shown below:

| Column | Line | |
|--------|------|---|
| 6 | 45 | Change "SurfaceCasting TM" to --SurfaceCasting ™--. |
| 6 | 47 | Change "SurfaceCasting TM" to --SurfaceCasting ™--. |
| 6 | 54 | Change "SurfaceCasting TM" to --SurfaceCasting ™--. |
| 6 | 66 | Change "ting TM" to --ting ™--. |
| 8 | 22 | Change "he" to --the--. |
| 10 | 50 | Change "an" to --a--. |
| 11 | 33 | Change "mark mark" to --mark-to-mark--. |
| 12 | 46 | Change "an" to --a--. |

Signed and Sealed this

Fourteenth Day of November, 1995

*Attest:*

BRUCE LEHMAN

*Attesting Officer*     *Commissioner of Patents and Trademarks*